United States Patent Office 2,844,437
Patented July 22, 1958

2,844,437

STABILIZED LOW REACTION RATE SODIUM ACID PYROPHOSPHATE

Leroy A. Kramer, Olympic Fields, and Lowell E. Netherton, Park Forest, Ill., assignors to Victor Chemical Works, a corporation of Illinois No Drawing. Application February 21, 1955
Serial No. 489,794

5 Claims. (Cl. 23—106)

This invention relates to a sodium acid pyrophosphate baking acid having a low reaction rate with sodium bicarbonate and its preparation.

Sodium acid pyrophosphate is a well-known baking acid for use in conjunction with $CO_2$ liberating compounds, such as sodium bicarbonate, in a variety of chemically leavened bakery products such as doughnuts, pancakes, biscuits, etc. Theoretically, sodium acid pyrophosphate is a definite chemical compound and its chemical properties should be uniform and its reaction and baking properties definitely predictable. However, from a practical standpoint the reaction characteristics of sodium acid pyrophosphate vary widely depending on manufacturing conditions, minor variations in composition and physical characteristics and also on the conditions of storage and use. Prior efforts to produce a commercial product having stable, uniform reaction characteristics have not been entirely successful. A primary difficulty has been in the stabilizing of the product to maintain a difinite reaction rate for reasonably long storage periods under normal atmospheric conditions. This is particularly important where the baker spreads the use of his supply of the baking acids over periods of several weeks or months. Obviously, it is important that the reaction rates and baking characteristics remain uniform over such extended periods of use. One means which has been employed in an attempt to provide a product having a uniform reaction rate has been that of subjecting the sodium acid pyrophophate product to an artificial curing procedure under controlled humidity and temperature conditions. Also, it has been proposed to add small amounts of potassium and aluminum impurities to the monosodium orthophosphate, prior to its conversion by heating, to the pyrophosphate, in order to reduce the rate of change in the reaction rate due to the effect of atmospheric humidity. These prior efforts have been partially successful in stabilizing the high reaction rate type of product. So far, however, no means have been proposed or found effective in controlling the stability of the product at low reaction rates.

Low reaction rate sodium acid pyrophosphate is highly desirable for use in the production of certain type bake products, for example, in the production of commercial ready to bake biscuit doughs.

By "low reaction rate" we means that a dough composition, containing sodium bicarbonate and the sodium acid pyrophosphate in proportion and amount to theoretically liberate 200 cc. of $CO_2$ gas, will liberate not more than 50 cc. or 25% of the total gas in 2 minutes when suspended in water at 27° C. Ordinary commercial high-reaction-rate products will liberate from 30 to 40% of the $CO_2$ under the same conditions.

Obviously a stable low-reaction-rate sodium acid pyrophosphate is a highly desirable baking acid for use in prepared biscuit doughs where a high retention of the leavening gas in the doughs is maintained for liberation in the baking stage at oven temperatures.

It has now been found that by adding controlled amounts of calcium and aluminum compounds to phosphoric acid prior to its reaction with sodium carbonate to produce monosodium phosphate having a controlled pH value, and subsequently controlling conversion of the monosodium phosphate to sodium acid pyrophosphate, a highly stable low-reaction-rate product may be obtained.

In general the new slow-acting stable sodium acid pyrophosphate is prepared by reacting phosphoric acid of about 80–88% strength, containing from 0.05–0.30% CaO, and 0.05–0.30% $Al_2O_3$, with a sodium-containing base such as sodium hydroxide, sodium carbonate and the like in proportions to produce a dry monosodium phosphate having a pH value of about 4.5 to 4.7, and thereafter heating the monosodium phosphate at a temperature of about 225–240° C. for a period of time sufficient to convert it to sodium acid pyrophosphate having a pH value of 4.0 to 4.3 and a stable (2 minute) reaction rate of about 40 to 50 cc. (20 to 25%).

We have found that the stabilizing effect of the calcium and aluminum additives is not obtained unless these additives are completely dissolved in the phosphoric acid prior to its use in the reaction with the sodium-containing base (e. g., sodium carbonate) in the first stage of the above described procedure. The addition of lime and aluminum hydroxide to sodium carbonate in the above procedure did not result in stabilizing the final sodium acid pyrophosphate. Further introduction of these additives in the pyrophosphate conversion stage of the process did not produce the desired stabilizing effect.

Various combination of impurities have been tested for their effect on the low reaction rate stability of sodium acid pyrophosphate and it has been found that only combinations of calcium and aluminum, and combinations of calcium, aluminum and potassium are satisfactory for low-rate-stability. Combinations of aluminum and potassium are known stabilizers for high-rate sodium acid pyrophosphate, but only when calcium is also added is the combination effective for low-rate (less than 25%) stabilization. The substitution of magnesium for calcium or iron for aluminum does not produce as much stabilizing effect.

The following example is illustrative of one mode of carrying out the invention, but is not to be construed as limiting its scope:

Five grams of dicalcium phosphate (dihydrate) and 2.7 grams of hydrated aluminum oxide ($Al_2O_3 \cdot 3H_2O$) were slurried in 100 cc. of water and added to 1630 grams of 87% $H_3PO_4$ solution. This acid was heated to about 80–90° C. until the solution was clear and then slowly added, while stirring, to 770 grams of soda ash ($Na_2CO_3$). The pH value of the resulting monosodium phosphate was 4.6.

100 grams of the above product were heated at 240° C. for 4 hours to convert it to sodium acid pyrophosphate. The product was milled to pass through a 200 mesh screen. It has a $Na_2H_2P_2O_7$ content of 97% and a pH value of 4.12 in 1% aqueous solution. It analyzed 0.1% CaO and 0.1% $Al_2O_3$ and had a two minute reaction rate of 22.0%. After exposure at 60° C. for 16 hours in an atmosphere of 75% relative humidity, the 2 minute reaction rate was 23%.

No definite explanation for the low rate stabilization effect of calcium plus aluminum (with or without potassium) is here proposed, but it seems possible that a complex sodium-calcium-aluminum acid pyrophosphate is formed uniformly throughout the sodium acid pyrophosphate. Such complexes, possibly, satisfy residual valence forces on the pyrophosphate surface and reduce the rate of adsorption of water vapor molecules in a humid atmosphere.

Also, in order to secure stable low-reaction-rate material it is necessary to control the proportions of reactants to yield a final sodium acid pyrophosphate having a pH value within the range of approximately 4.0 to 4.4, preferably from 4.1 to 4.3. Variations in the amounts of the calcium, aluminum and potassium additives decrease or increase the effective pH range within which satisfactory low-rate stable material may be produced. For example, with a minimum level of 0.05% CaO and 0.05% $Al_2O_3$ a pH value of 4.0 to 4.2 should be maintained, whereas with 0.2% of each of these impurities the pH may be within the range of 4.0 to 4.5 and still result in the production of a stable sodium acid pyrophosphate having a reaction rate of less than 25% even after storage under accelerated storage conditions, namely, 16 hours at 60° C. in an atmosphere of 75% relative humidity. This accelerated storage test is somewhat more drastic than the 7 day storage at 75% relative humidity at 30° C. which was disclosed in the literature for testing sodium acid pyrophosphates.

The following table shows the 2 minute reaction rates of sodium acid pyrophosphates made with varying amounts of calcium, aluminum and potassium impurities within a pH range of about 4.0 to 4.5. The stability of these products is illustrated by the low 2 minute reaction rate after exposure of the product for 16 hours at 60° C. in an atmosphere of 75% relative humidity.

The impurities shown in the table represent impurity contents of the sodium acid pyrophosphate product resulting from the introduction of such impurities in the phosphoric acid prior to its use in the manufacture of the monosodium phosphate and its conversion to the sodium acid pyrophosphate product.

| Sodium Acid Pyrophosphate Impurity Contents | | | pH | 2 minute rate Original percent of total $CO_2$ | 2 minute rate after exposure at 60° C. and 75% relative humidity for 16 hours, percent of total $CO_2$ |
| --- | --- | --- | --- | --- | --- |
| Percent CaO | Percent $Al_2O_3$ | Percent $K_2O$ | | | |
| None | None | None | 4.00 | 30.5 | |
| None | None | None | 4.50 | 39.0 | |
| 0.15 | None | None | 4.20 | 30.5 | |
| 0.15 | None | None | 4.40 | 30.5 | |
| None | 0.10 | None | 4.20 | 25.0 | 27.0 |
| None | 0.30 | None | 4.20 | 27.5 | |
| 0.05 | 0.05 | None | 4.11 | 22.0 | 24.5 |
| 0.05 | 0.05 | None | 4.30 | 24.0 | 31.0 |
| 0.10 | 0.10 | None | 4.12 | 22.0 | 23.0 |
| 0.10 | 0.10 | None | 4.25 | 21.5 | 23.5 |
| 0.20 | 0.20 | None | 4.07 | 21.0 | 24.0 |
| 0.20 | 0.20 | None | 4.36 | 22.0 | 24.5 |
| 0.20 | 0.20 | None | 4.50 | 20.5 | 23.0 |
| 0.10 | 0.10 | 0.10 | 4.00 | 22.0 | 23.0 |
| 0.10 | 0.10 | 0.10 | 4.32 | 22.0 | 24.0 |
| 0.20 | 0.20 | 0.20 | 4.07 | 22.0 | 23.5 |
| 0.20 | 0.20 | 0.20 | 4.40 | 22.0 | 22.0 |
| 0.20 | 0.20 | 0.20 | 4.57 | 24.0 | 30.5 |

From the above table it can be seen that with either calcium or aluminum alone the sodium acid pyrophosphate is not stabilized at the desirable low reaction rate of 25% or less. However, with the combination of calcium and aluminum and/or potassium stable low reaction rate products are obtained over a satisfactory range of pH values from 4.0 to 4.40 and in some cases up to 4.50.

Larger amounts than 0.3% CaO and 0.3% $Al_2O_3$ may be used without harming the stability of the product, but no additional advantage is gained by the use of more than 0.3% of these stabilizing agents.

We claim:

1. A stabilized sodium acid pyrophosphate containing from 0.05 to 0.3% CaO and from 0.05 to 0.3% $Al_2O_3$ having a pH value from about 4.0 to 4.4 and having a reaction rate with sodium bicarbonate in an aqueous dough suspension of 20–25% of the total gas in 2 minutes at 27° C., said sodium acid pyrophosphate having been produced by reacting a sodium-containing base with phosphoric acid containing, in solution, the calcium and aluminum stabilizing agents, and heating the resultant reaction product at a temperature of about 225° to 240° C. until the product is converted to the acid pyrophosphate compound.

2. The product set forth in claim 1 wherein the sodium-containing base is sodium carbonate.

3. The product set forth in claim 1 wherein the amounts of CaO and $Al_2O_3$ are from 0.1 to 0.2% each, and the pH range is from about 4.1 to 4.3.

4. The product set forth in claim 2 wherein the amounts of CaO and $Al_2O_3$ are from 0.1 to 0.2% each, and the pH range is from about 4.1 to 4.3.

5. A method of preparing a stabilized sodium acid pyrophosphate having a low reaction rate with sodium bicarbonate in an aqueous dough suspension at 27° C., which comprises reacting a sodium-containing base with phosphoric acid in proportions to form monosodium orthophosphate and heating said monosodium orthophosphate at a temperature of about 225° to 240° C. for a sufficient period of time to convert the product to sodium acid pyrophosphate having a pH value of about 4.0 to 4.4 and containing calcium and aluminum equivalent to 0.05 to 0.3% CaO and 0.05 to 0.3% $Al_2O_3$ of the sodium acid pyrophosphate, said calcium and aluminum having been introduced by solution in the original phosphoric acid reactant.

References Cited in the file of this patent

UNITED STATES PATENTS

| 2,408,258 | Hetzel et al. | Sept. 24, 1946 |
| 2,630,372 | Wright | Mar. 3, 1953 |
| 2,636,808 | Hubbard et al. | Apr. 28, 1953 |